US007837769B2

(12) United States Patent
Lahr

(10) Patent No.: US 7,837,769 B2
(45) Date of Patent: Nov. 23, 2010

(54) METHOD AND APPARATUS FOR DEGASSING FLUID IN ENCLOSED CONTAINERS

(76) Inventor: Rhone Daniel Lahr, 106 Hickory Point, McCormick, SC (US) 29835

( * ) Notice: Subject to any disclaimer, the term of this patent is extended or adjusted under 35 U.S.C. 154(b) by 119 days.

(21) Appl. No.: 12/264,551

(22) Filed: Nov. 4, 2008

(65) Prior Publication Data
US 2009/0133579 A1 May 28, 2009

Related U.S. Application Data

(60) Provisional application No. 60/990,584, filed on Nov. 27, 2007.

(51) Int. Cl.
*B01D 19/00* (2006.01)
(52) U.S. Cl. .......................... 95/266; 96/193; 426/404; 426/488
(58) Field of Classification Search ............... 95/266; 96/193; 426/404, 487, 488
See application file for complete search history.

(56) References Cited

U.S. PATENT DOCUMENTS

| 4,494,452 A | 1/1985 | Barzso |
| 4,960,364 A * | 10/1990 | Tell ............................ 417/174 |
| 5,555,735 A * | 9/1996 | Elliott, Jr. ...................... 62/100 |
| 5,713,263 A | 2/1998 | Burks |
| 6,332,706 B1 | 12/2001 | Hall |
| 6,500,239 B2 * | 12/2002 | Castellano et al. ............. 95/247 |
| 6,955,706 B2 * | 10/2005 | Varrin et al. .................... 95/46 |
| 2002/0129705 A1 * | 9/2002 | Castellano et al. ............. 95/248 |
| 2004/0177676 A1 * | 9/2004 | Moore ........................... 73/38 |
| 2007/0199615 A1 * | 8/2007 | Larimer et al. ................. 141/95 |
| 2009/0274793 A1 * | 11/2009 | Schroeder ....................... 426/8 |

* cited by examiner

*Primary Examiner*—Duane Smith
*Assistant Examiner*—Douglas J Theisen
(74) *Attorney, Agent, or Firm*—Berenato & White, LLC

(57) ABSTRACT

Disclosed is a compressed air powered vacuum mechanism and method for enabling a user to lower atmospheric pressure in enclosed containers and thereby remove carbon dioxide and other entrained gasses from fluids, in this instance wine, in multiple enclosed containers. In a short time, the resulting wine will improve in taste and aroma and clarity, an improvement normally associated with wine that has been naturally aged for many months. A compressed air driven vacuum generator reduces the atmospheric pressure above the wine. When the atmospheric pressure is low enough the entrained gasses will quickly boil off the enclosed wine at room temperatures, disassociating from the fluid, without harming the wine. There are instances in the processing of wine and in keeping containers of food and drink fresh, where following the removing of gasses from the enclosed containers that the vacuum must be retained. This is optionally accomplished with a vacuum retaining on/off mechanism.

5 Claims, 3 Drawing Sheets

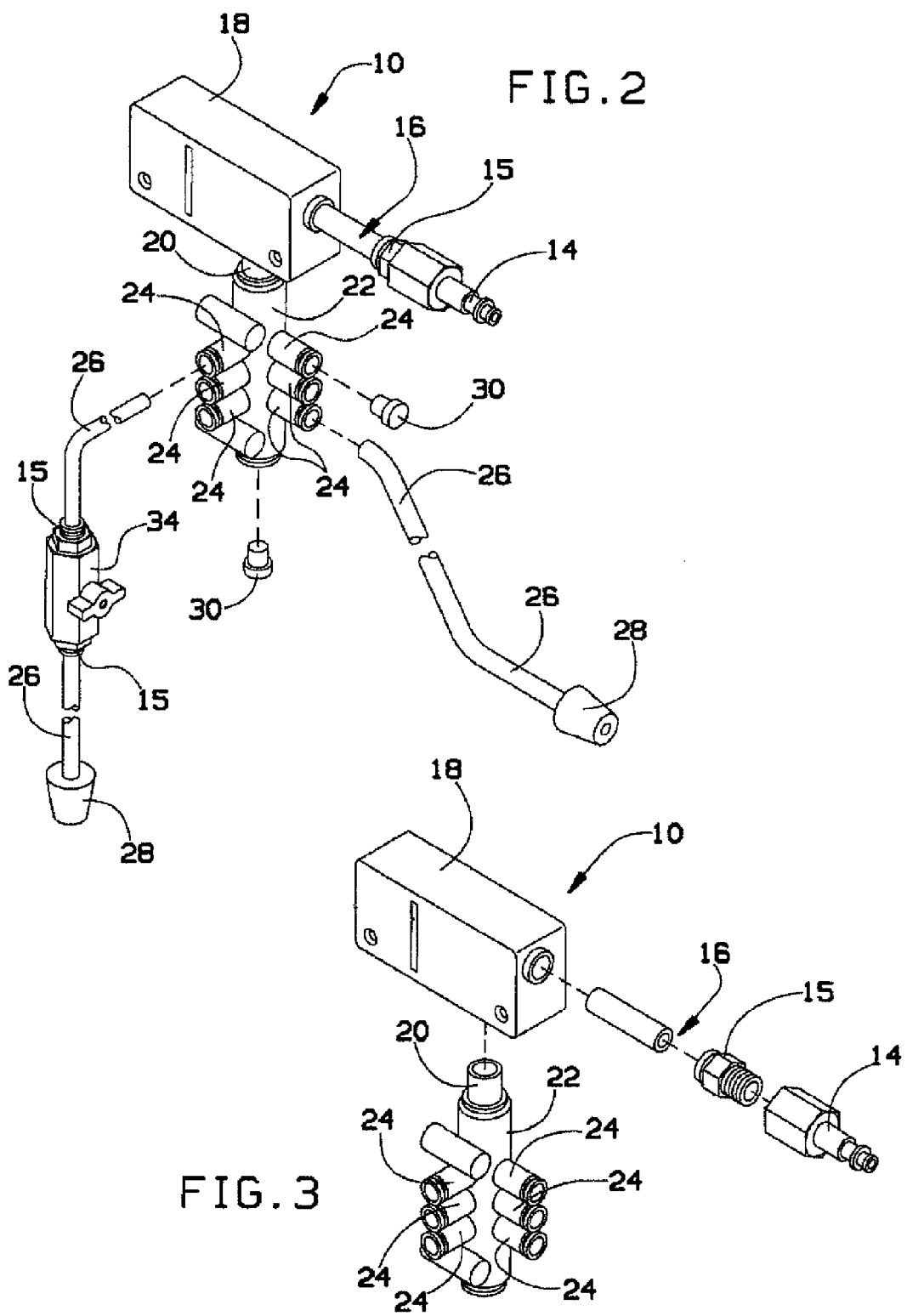

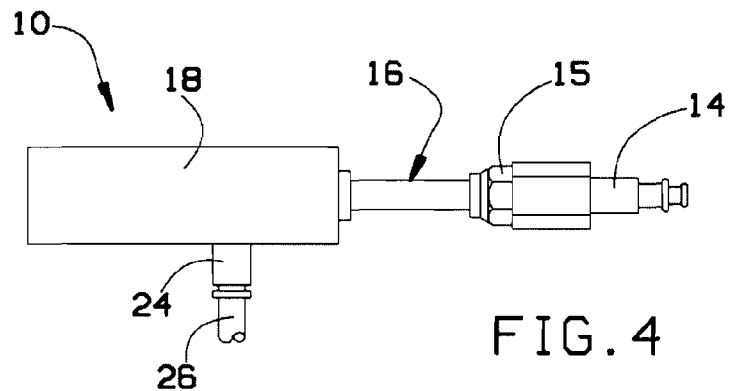
FIG. 4
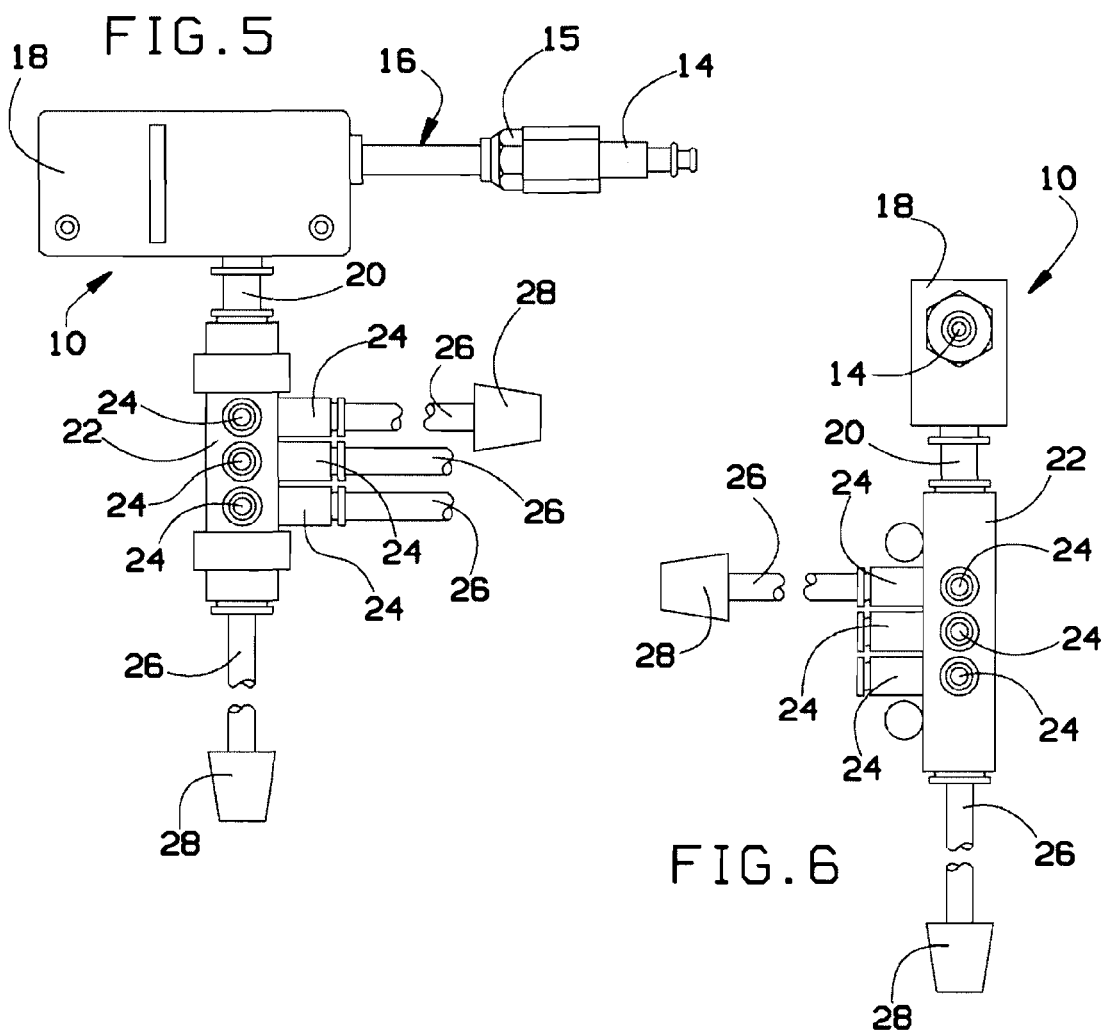
FIG. 5
FIG. 6

METHOD AND APPARATUS FOR DEGASSING FLUID IN ENCLOSED CONTAINERS

CROSS-REFERENCE TO RELATED APPLICATIONS

This application claims the benefit of U.S. Provisional Application No. 60/990,584; filed 27 Nov. 2007.

BACKGROUND OF THE INVENTION

1. Field of the Invention

The invention relates generally to a compressed air powered vacuum mechanism that lowers atmospheric pressure in enclosed containers and removes carbon dioxide and other entrained gasses from fluids contained therein; most advantageously wine.

2. Background

The basic wine making process uses yeast to metabolize sugar into alcohol. During this process, large amounts of carbon dioxide and other gasses are absorbed into the wine solution during fermentation. These gasses create unwanted conditions in the "young" wine. The gasses may create an effervescent sensation as the wine is consumed. The carbon dioxide creates carbonic acid on the tongue; hence, the undesirable sharp taste common in "young" wines. These gasses also inhibit the further emergence of the tastes, aromas and in some cases the clarity that are desired in fine wines.

Currently there are three popular solutions for removing carbon dioxide and other gasses from newly processed wines: (1) "Natural aging" which requires both months of time and atmosphere (climate) controlled facilities; (2) "Violent agitation" a method that uses a common household drill mounted with a stirring devise or stirring by hand with a long handled spoon (This method is both work intensive and leaves uncertain amounts of the undesired gasses in the wine solution): and, (3) Relatively small electric vacuum pumps (of the variety commonly used in mortuaries). These pumps are expensive and lack sufficient power to be efficient in multi container applications.

SUMMARY OF THE INVENTION

It would be desirable to have a device that substantially lowers atmospheric pressure in enclosed containers and removes carbon dioxide and other gasses entrained in newly processed wine which would immediately promote positive changes in tastes and aromas that would take months to accomplish using the natural aging processes. Still further, it would be desirable to have a device that efficiently removes these gasses from multiple containers with little or no physical work intensity required. There currently exists a need in the industry for a device and associated method that when used with multiple containers of newly processed wine, lowers the atmospheric pressure enough to allow the entrained gasses to boil off at room temperatures without harming the wine.

The present invention advantageously fills the aforementioned deficiencies by providing a compressed air powered vacuum mechanism that lowers atmospheric pressure in enclosed containers and removes carbon dioxide and other entrained gasses from wine.

The present invention is made up of the following components: A source for compressed air (normally a common, light industrial, moderately sized, air compressor), a hose coupling to connect to the air source, the other end threaded to an adapter for connecting the hose coupling with a length of tubing to a vacuum generator (a mechanism that allows the compressed air to proceed over an orifice to produce a vacuum), a length of tubing and/or adapters to connect to a manifold with multiple ports, tubing, adapters and connecters for connecting to containers of wine, (in addition: plugs for manifold ports that allows for the processing of a fewer number of containers than number of manifold ports.) A part (cut-off valve) for maintaining the vacuum charge within the vacuumed container consisting of a length of tubing to connect to a port in the manifold, a threaded adapter that connects the tubing to a manual on/off valve, a threaded adapter to connect the valve to another length of tubing and an adapter and, where necessary, to connect the tubing to the container being subjected to the vacuum.

The present invention also provides a method associated with a compressed air powered vacuum mechanism that removes gasses from enclosed containers. Maintaining the vacuum created here could be used anywhere where an applied vacuum is an advantage in maintaining freshness. Keeping food and drink fresh, retarding bacterial action, removing gasses from enclosed containers, creating soft packs for storing materials in smaller volumes or keeping materials from oxidizing. The method of using this device includes the following steps: creating a source of vacuum, associating the vacuum with an enclosed container for a predetermined period of time, causing said vacuum source associated with the container to cease, while simultaneously maintaining a predetermined vacuum in the enclosed container.

The present invention apparatus and method are unique when compared with other known processes and solutions in that it removes gasses entrained in newly processed wine: (1) inexpensively and quickly with no need for being stored for months in a controlled environment; (2) rapidly and efficiently in multiple number(s) of atmospherically linked enclosed containers. Note: Since this process is performed in an enclosed environment the user can proceed with the process for as long as he desires without the fear of spilling or oxidizing his wine; and, (3) there is no intensive physical work associated with this method.

When the atmospheric pressure is lowered to a sufficient degree, the entrained gasses will boil off at room temperatures without harming the wine. It removes carbon dioxide and other entrained gasses quickly with low expense and work intensity. Removing these gasses removes the objectionable sharp taste common in "young" wines. It allows the desired tastes and aromas to emerge from the wine and in some cases promotes better clarifying of the wine.

When wine is exposed to air, it will oxidize similar to the way a freshly cut apple will turn brown. When wine makers have a large container of wine that is not quite full, they will "top up" by adding water (which dilutes the wine) or charge the open space with an inert bottled gas like nitrogen, which requires some extra cost. The "vacuum/air" control valve included in this invention allows a partially filled container of wine to be kept "fresh" by trapping the vacuum charge (using the cut-off valve) in the container after it has been degassed.

The present invention will now be described more fully hereinafter with reference to the accompanying drawings, which are intended to be read in conjunction with both this summary, the detailed description, and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWINGS

FIG. 2: is a perspective view of the invention (10) showing the use of plugs (30) necessary when vacuuming fewer numbers of enclosed containers than there are manifold ports.

FIG. 3: is an exploded perspective of the vacuum generator part of the invention (10).

FIG. 4: is a top plan elevation view of the vacuum generator part of the invention (10).

FIG. 5: is a front plan elevation of the invention (10).

FIG. 6: is a side plan elevation of the invention (10).

DETAILED DESCRIPTION OF THE INVENTION

Figure 1:
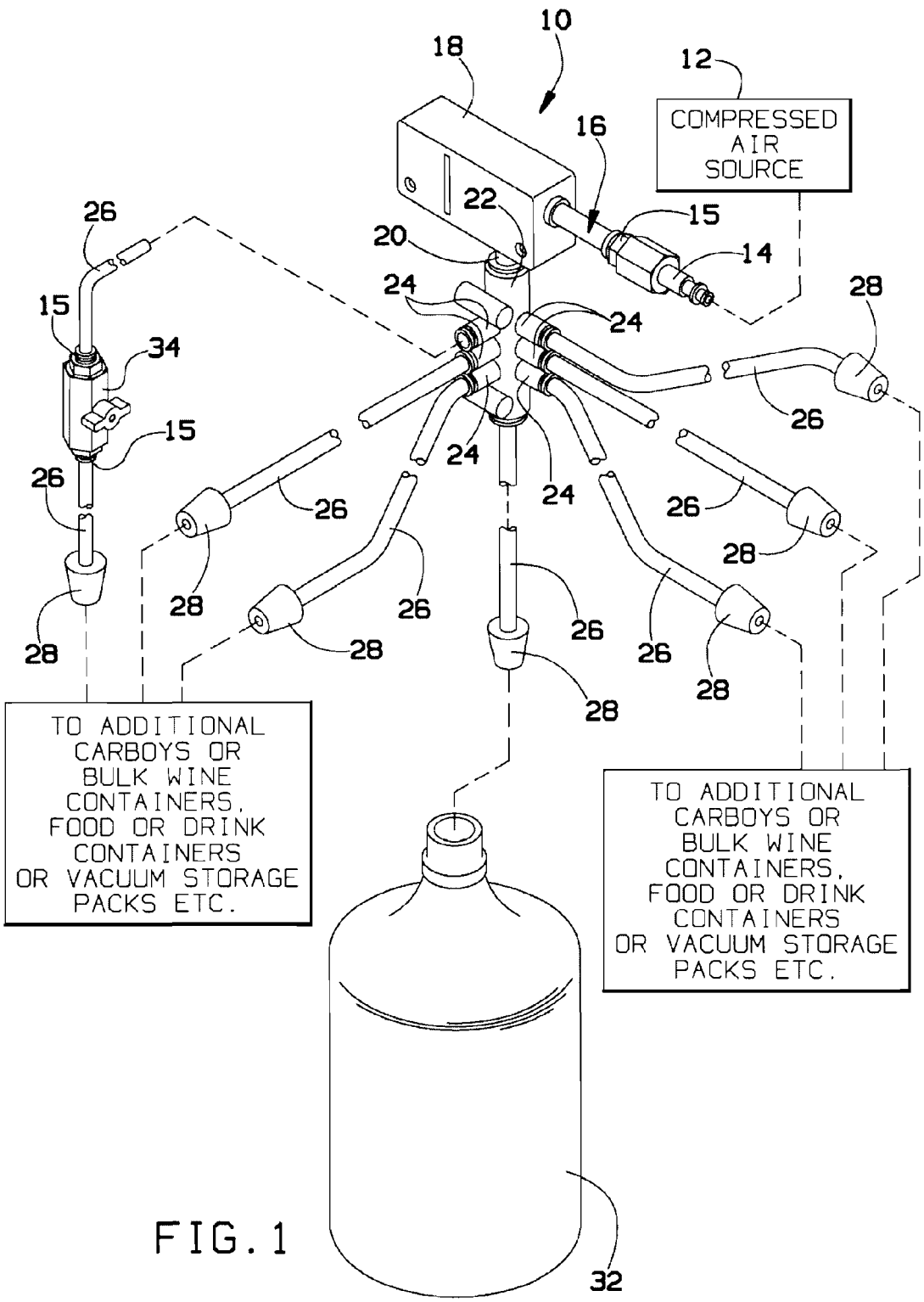
FIG. 1: is a perspective view of the present invention (10) in use.

The present invention is directed to a compressed air powered vacuum mechanism that lowers atmospheric pressure in enclosed containers and removes carbon dioxide and other entrained gasses from wine.

With reference to FIGS. 1, 4, 5, and 6: The invention (10) is comprised of the following components: A source (12) for compressed air (a common, light industrial, air compressor) capable of continuously providing compressed air at about 60-65 psig. is sufficient. The required horsepower rating of the compressor to successfully supply sufficient air at the required pressure has been determined according to the approximate formulation: 0.5 hp/5 gallon wine carboy that needs degassing. So, for a single 5 gallon carboy of wine, a single 0.5 horsepower compressor will do. As the number of linked carboys rises, adding a 0.5 hp rating for each additional 5 gallon carboy appears necessary up to about 4 manifold linked 5 gallon carboys. Beyond this number, the compressor is better sized by monitoring the pressure drop that can be achieved in the linked carboys. Generally, a negative pressure (vacuum) rating of 23.5 inches of mercury is sufficient in each carboy. Using this method, a 2 hp compressor can be successfully used for 6 manifold linked 5 gallon carboys. Beyond this number, a higher horsepower rating is necessary as carboys are added, with ratings of up to 5.5 hp having been used. It is the negative pressure (vacuum) in the respective enclosed containers (the manifold linked carboys) that needs to be monitored so that a sufficient vacuum can be observed and maintained.

In each apparatus, a hose coupling (14) is connected to the air source (12). Threaded adapters (15), threaded on one end and with a leak proof fitting on the other end, are shown for connecting the hose coupling with a length of tubing (16) to connect the vacuum generator (18), a mechanism that allows the compressed air (12) to proceed over an orifice to produce a vacuum. A length of tubing (20) and/or adapters are used to connect to a manifold (22) with multiple numbers of ports (24). Tubing (26), adapters and connectors (28) are used for connecting to containers of wine (32), and a cut-off valve part (34) for maintaining the vacuum within the vacuumed container (32). This valve part (34) connects to a length of tubing (26) to connect to a port (24) in the manifold (22). A threaded adapter (15) connects the tubing (26) to a manual on/off valve (34), another threaded adapter (15) connects the valve (34) to another length of tubing (26) and an adapter (28), where necessary, to connect the tubing (26) to the container (32) being vacuumed. Note: The "vacuum/air control" valve (34) is optional. The "vacuum/air" air control valve (34) may be placed in the individual vacuum lines as shown in FIGS. 1 & 2 to maintain the atmospheric conditions created by the invention (10) in an individual enclosed container (32). The control valve (34) may also be placed between the air source coupling adapter (15) and the vacuum generator (18) to control compressed air flow (12) and/or it may be placed between the vacuum generator (18) and the manifold (22) to maintain the atmospheric conditions created by the invention (10) in multiple enclosed containers (32).

A common container/carboy (32) size is 5 gallons and is made of a sufficiently rigid glass/ceramic/steel, capable of withstanding negative pressure (vacuum) in a range of 27 in. Hg. (Other sizes of carboys will also work, e.g., 3 and 6 gallon versions.) The throat of the container accepts a stopper, made of a soft rubber-like material, in a size #7 (conically shaped approximately 1" high, 1½" dia. at the top and 1⅛" dia. at the bottom). (Any airtight stopper configuration will work.) The coupling hose sizes are in the range of 0.25" to 0.375" with appropriately sized threaded fittings in accord with those hose dimensions. The tubing (16), carrying the compressed air are polyurethane type of hose typically capable of carrying 160 psi minimum burst pressure. The negative pressure/vacuum hoses (26, et al.) are of polyurethane type and typically capable of carrying 28 in. Hg vacuum before collapse. A suitable vacuum generator is one sold under the label "vacuum ejector" and is capable of creating 26 in Hg of vacuum when being fed 60-65 Psig air at a rate sufficient for the number of linked carboys. A suitable vacuum ejector can be an "in-line" model, where the vacuum is ejected laterally, or a ported and silenced type vacuum ejector. A variety of suitable vacuum ejectors are sold under the "SMC" brand under the model line ZH and ZU, and include, for example, the type shown in U.S. Pat. No. 4,960,364, the contents of which are incorporated herein by reference.

With reference to FIG. 2: The invention (10) is comprised of the same components as for the embodiment shown in FIG. 1. In this embodiment, plugs (30) are used to block unused ports on the manifold (22).

With reference to FIG. 3: The vacuum apparatus of the present invention is shown in exploded form. This view shows the respective threaded couplings, length of tubing (16), and fittings that provide leak proof association between the manifold (22) and the vacuum generator (18). A length of tubing (20) and/or adapters connect the manifold (22) with multi numbers of ports (24) to the vacuum generator.

To use the apparatus (10) to improve the taste and shorten the aging process of newly processed wine, the assembly is connected as shown in FIG. 1. A source of compressed air capable of providing about 60-65 psig for lengthy continuous intervals of up to 5-6 hours is connected with input at line 14. Depending on the amount of treatment desired to be administered and the number of enclosed containers (32) that are connected to the system, 15 to 300 minutes of room temperature boiling of the liquid mixture is satisfactory. The length of time depends on the particular mixture being degassed. 5 hours is the length of time for near total degassing. Shorter intervals will create lesser results, but that may be all that is necessary depending on the mixture the process is being used to de-gas. A degassing time of 15-75 minutes is enough for one 5 gallon carboy of most red and white wines. The following steps are followed in order: filling the carboys to approximately 90% of capacity with the liquid to de-gas; inserting stoppers into the throats of the carboys and linking those carboys to the manifold and vacuum generator and compressor. When all seals and stoppers have been re-checked for seal adequacy, initiating the operation of the compressor and observing the negative pressure generated in the system so that approximately negative 23.5 inches of Hg is obtained.

(Weak bubbling in the liquid will commence at about negative 16 inches of Hg.). Thereafter, boiling the enclosed liquids in the linked carboys using negative pressure for a predetermined length of time between 15 and 300 minutes. When finished, selectively cutting off the vacuum to respective carboys, as desired, to maintain vacuum in the cut-off carboy. The vacuum, if kept sealed, can be maintained for as long as desired following initial boiling treatment. It has been found that, over time (several weeks), the negative pressure maintained in the carboy steadily reduces as small amounts of gas continue to be removed from the liquid until an equilibrium between dissolved gas and pressure above the liquid is obtained. This treatment has been found, by trial-and-error estimation, to approximate the aging process of at least 1 year in a bottled condition. Wine subject to this procedure tastes better sooner, has more natural aromas without residue, and in some cases aides clarity.

While the present invention has been described above in terms of specific embodiments, it is to be understood that the invention is not limited to these disclosed embodiments. Many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

The invention claimed is:

1. An apparatus for removing entrained gasses from new wine in an enclosed container, comprising:
   a rigid container for containing a new wine to be de-gassed and being capable of resisting up to approximately 27 inches of Hg of vacuum without collapse, said container including a throated access passage and an air-tight stopper inserted therein, said stopper having a fitting associated therewith for communicating a vacuum to an interior of said container and capable of connecting to a negative pressure source supplied through a length of tubing;
   a source of compressed air, capable of continuously providing compressed air at 60-65 psig. for intervals of 15-300 minutes through a length of tubing;
   a vacuum generator connected through a positive pressure port thereof to said source of compressed air through said length of tubing and capable of generating a vacuum at an inlet negative pressure port thereof of approximately 23 inches of Hg vacuum when said source of compressed air is actively supplying compressed air to said positive pressure port, said source of compressed air power rating selected in accord with the formulation of approximately 0.5 horsepower of compressor power per each single 5 gallon sized enclosed container connected to said vacuum generator and rising in power selection as additional containers are added so as to maintain said approximately 23 inches of Hg vacuum in each connected container, said inlet port being connected to said length of tubing.

2. An apparatus as in claim 1, further comprising:
   a multi-port manifold connected to said inlet port of said vacuum generator, said manifold enabling the connection, through respective lengths of tubing, of a plurality of stopper equipped enclosed rigid containers to enable simultaneous de-gassing of plurality of containers.

3. An apparatus as in claim 2, wherein:
   a cut-off valve is connected between at least one of said enclosed containers and said manifold such that negative pressure may be maintained in said enclosed container following de-gassing thereof.

4. An apparatus as in claim 2, wherein:
   a cut-off valve is connected between the vacuum generator and said manifold such that the negative pressure may be maintained in said enclosed containers attached to the manifold following de-gassing thereof.

5. A method of improving the taste and aroma of new wine following fermentation by removing entrained gasses causing formation of carbonic acids and other taste and aroma spoiling effects, comprising the steps of:
   filling a throated rigid container capable of resisting 27 inches of vacuum to an approximately 90% fill level with new wine;
   sealing said throated container by inserting a stopper into said throat, said stopper including a fitting for communicating with an interior of said rigid container;
   connecting said fitting through a length of tubing to a vacuum generator, said vacuum generator capable of generating approximately 23 inches of Hg vacuum when connected to a source of compressed air, said source of compressed air horsepower rating selected in accord with the formulation of approximately 0.5 horsepower of compressor power per each single 5 gallon sized container connected to said vacuum generator and rising in power selection as additional containers are added so as to maintain said approximately 23 inches of Hg vacuum in each connected container;
   connecting said vacuum generator to a source of compressed air;
   activating said source of compressed air for 15-300 minutes and actively boiling said new wine at approximately room temperature within said container;
   removing, from said new wine, carbon dioxide and other entrained gasses remaining as bi-products of fermentation in said new wine and substantially lessening formation of carbonic acid in said new wine and ejecting said gasses from said vacuum generator;
   sealing off said throated container from said vacuum generator and maintaining said new wine in a sealed degassed condition in said container; and,
   de-activating said source of compressed air.

* * * * *